July 25, 1961  K. MÜHLEGG  2,993,256
FIXING BRIDLES
Filed June 7, 1957
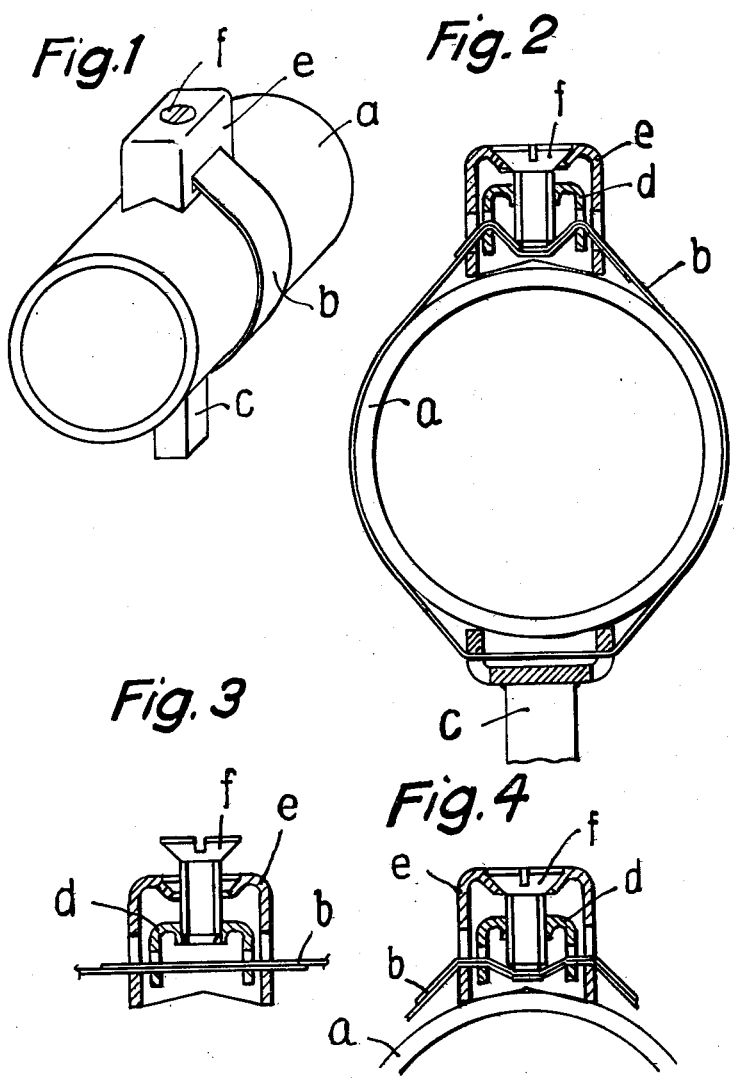
KURT MÜHLEGG
INVENTOR
By Wenderoth, Lind & Ponack
Attys

United States Patent Office 2,993,256
Patented July 25, 1961

2,993,256
FIXING BRIDLES
Kurt Mühlegg, Wynau, Switzerland, assignor to
Hermann Lanz A.G., Murgenthal, Switzerland
Filed June 7, 1957, Ser. No. 664,421
4 Claims. (Cl. 24—278)

The present invention relates to a fixing bridle, which comprises a flexible band for embracing the article to be fixed and a tightening device for this band.

This fixing bridle is characterized according to the invention in that said tightening device comprises two tightening pieces, which are slidably arranged one in the other and formed with openings for the passage of the ends of the embracing band, and a tightening member associated with said tightening pieces, the whole arrangement being such that when the ends of the band embracing the article to be fixed have been inserted from opposite sides through the two tightening pieces while the tightening member has not been tightened and the tightening member is then tightened the latter will first flex the end portions of the band towards the article to be fixed and will then pull the inner tightening piece away from said article so as to tighten the embracing band.

An illustrative embodiment of the invention is shown on the accompanying drawing, in which FIG. 1 shows the fixing bridle as applied to a pipe, FIG. 2 is a cross-sectional view showing the pipe bridle on a larger scale, and FIGS. 3 and 4 are cross-sectional views showing a tightening device of the pipe bridle in two different positions.

In FIGS. 1 and 2, *a* indicates a pipe to be fixed by a pipe bridle. This pipe bridle comprises a flexible metal band *b*, which embraces the pipe and extends through the apertured limbs of the U-shaped head of a fixing pin *c*. This embracing band *b* has associated with it a tightening device, which comprises two tightening pieces *d* and *e* of U-shaped cross-section, which are arranged one in the other and two opposite side portions of which have transverse openings, through which the ends of the embracing band *b* can be stuck. The transverse portion of the smaller clamping piece *d* has a threaded hole for a tightening screw *f* and the transverse portion of the larger tightening piece *e* has a hole which corresponds to the head of this screw.

While the screw *f* has not yet been inserted the ends of the embracing band *b* are inserted from opposite sides through the apertured side portions of the two tightening pieces *d* and *e* extending towards the pipe, as is shown in FIG. 3. When the screw *f* is then tightened the end portions of the band will first be flexed towards the pipe *a* (see FIG. 4) whereby they are clamped so that they can no longer be pulled apart. Further tightening the screw *f* will pull the smaller tightening piece *d* towards the screw head, whereby the embracing band *b* is tightened, as is shown in FIG. 1.

The outer tightening piece *a* consists suitably of a cover having four side walls which are at right angles to each other, whereas the lower tightening piece *d* consists of a U-shaped member.

What is claimed is:

1. A clamping device comprising a flexible band having two ends, said band being adapted to embrace an article, an inner and an outer tightening piece, said inner tightening piece being slidably arranged in the outer tightening piece, each of said tightening pieces having side portions with openings therein completely surrounded by the material of the pieces, the lower portion of the openings in said outer tightening piece being aligned with the openings in the inner tightening piece, said openings being adapted to receive the ends of said band therethrough from opposite sides thereof, and a tightening member joining said tightening pieces for first moving relative to said tightening pieces to flex said ends of said band toward the article when the band has been applied around the article and said ends have been inserted through said openings, and simultaneously moving said tightening pieces relative to each other to pull the inner tightening piece away from said article to tighten the band, the openings in the outer tightening piece having a greater height than the openings in the inner tightening piece so that the top edges of the openings in the outer tightening piece will be located above the lower edges of the openings in the inner tightening piece at all times during the operation of the tightening member.

2. A clamping device as claimed in claim 1 in which said tightening pieces each comprise a transverse portion arranged remote from said article in the operative position of the clamping device and said side portions extend from the ends of said transverse portion towards said article in said operative position, the transverse portion of said inner tightening piece having a threaded hole therein and the transverse portion of said outer tightening piece having a hole therein larger in diameter than said threaded hole, and said tightening member consisting of a screw longer than the distance from the level of said aligned openings to the transverse portion of said outer tightening piece and extending freely through said larger hole and in threaded engagement with said threaded hole.

3. Tightening means for tightening a flexible band having two ends and adapted to be applied around an article to be clamped, said tightening means comprising an inner and an outer tightening piece, said inner tightening piece being slidably arranged in the outer tightening piece, each of said tightening pieces having side portions with openings therein completely surrounded by the material of the pieces, the lower portion of the openings in said outer tightening piece being aligned with the openings in the inner tightening piece, said openings being for receiving the ends of the band therethrough from opposite sides thereof, and a single tightening member joining said tightening pieces for first moving relative to said tightening pieces to flex said ends of said band toward the article to be fixed when the band has been applied around the article and said ends have been inserted through said openings, and simultaneously moving said tightening pieces relative to each other to pull the inner tightening piece away from said article to tighten the band, the openings in the outer tightening piece having a greater height than the openings in the inner tightening piece so that the top edges of the openings in the outer tightening piece will be located above the lower edges of the openings in the inner tightening piece at all times during the operation of the tightening member.

4. Tightening means as claimed in claim 3 in which said tightening pieces each comprise a transverse portion arranged remote from said article in the operative position of the tightening means and said side portions extend from the ends of said transverse portion towards said article in said operative position, the transverse portion of said inner tightening piece having a threaded hole therein and the transverse portion of said outer tightening piece having a hole therein larger in diameter than said threaded hole, and said tightening member consisting of a screw longer than the distance from the level of said aligned openings to the transverse portion of said outer tightening piece and extending freely through said larger hole and in threaded engagement with said threaded hole.

References Cited in the file of this patent

UNITED STATES PATENTS

| | | |
|---|---|---|
| 1,053,684 | Vogel | Feb. 18, 1913 |
| 2,621,383 | Tresidder | Dec. 16, 1952 |
| 2,673,383 | Calder | Mar. 30, 1954 |

FOREIGN PATENTS

| | | |
|---|---|---|
| 142,179 | Austria | June 25, 1935 |
| 798,066 | France | Mar. 2, 1936 |
| 1,035,161 | France | Apr. 15, 1953 |
| 1,112,038 | France | Nov. 9, 1955 |